May 12, 1936.　　　　C. G. SUITS　　　　2,040,677
PULSATION APPARATUS
Filed Sept. 12, 1933
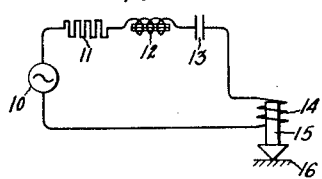
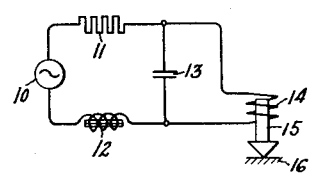
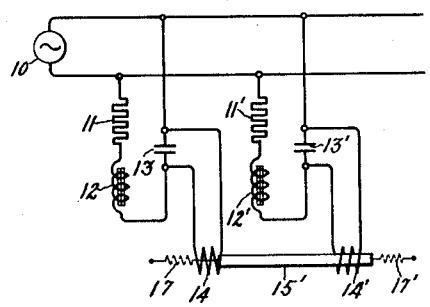
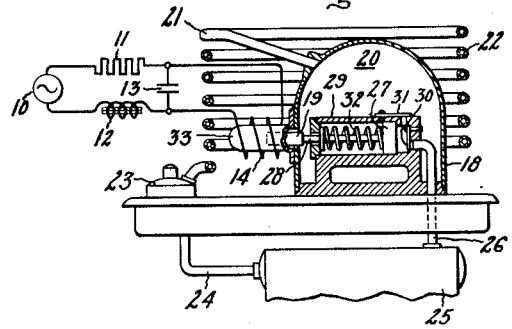
Inventor:
Chauncey G. Suits,
by Harry E. Dunham
His Attorney.

Patented May 12, 1936

2,040,677

UNITED STATES PATENT OFFICE 2,040,677

PULSATION APPARATUS

Chauncey G. Suits, Schenectady, N. Y., assignor to General Electric Company, a corporation of New York Application September 12, 1933, Serial No. 689,150

8 Claims. (Cl. 172—240)

My invention relates to apparatus for producing current pulsations in an electric circuit, and more particularly to electrical means for producing reciprocating or oscillating motion of a movable element.

Many electrical arrangements have been used or proposed in the past for obtaining oscillating or reciprocating motion of mechanical devices such as hammers, plunger type pumps and the like, but most of these arrangements have required synchronously operated switches, or special generators, or other expensive or moving parts.

It is an object of my invention to provide improved electrical means for producing current pulsations, particularly those of relatively low frequency in an alternating-current circuit.

It is another object of my invention to provide improved electrical means for producing mechanical oscillating or reciprocating motion in which there are no moving contacts, interrupters, or switches and which is simple in construction, reliable in operation, and inexpensive to manufacture.

In accordance with my invention I employ an electric circuit having connected therein in series relation resistance, capacitance, and inductance elements. It has been known for some time that certain unusual resonance effects occur in circuits of this type when the inductance is adapted to saturate within the normal range of operation of the circuit. If the circuit elements are connected in series and properly dimensioned, it will be observed that for a gradually increasing applied alternating voltage of constant frequency, the effective current is not proportional to the voltage, but increases critically at a certain voltage. Similarly, for a gradually decreasing voltage at constant frequency the effective current decreases critically at a certain voltage. My observations have also revealed that when a series circuit of the type mentioned is energized by a voltage slightly higher than the critical voltage for the high current condition and one of the impedance elements, namely, the resistance, capacitance, or inductance is varied a relatively small amount, an abrupt decrease of the current in the circuit is obtained similarly to the abrupt change in current for a gradually decreasing applied voltage. Consider first the case in which the inductance may be varied as, for example, by moving an armature or a core relative to an inductive winding or by varying the number of turns. With a voltage applied to the circuit which is slightly higher than the voltage necessary to obtain the high current condition in the circuit I have noted that when the inductance is slightly increased the current in the circuit will suddenly decrease to a low current condition. Similarly, an increase in resistance will cause an abrupt change in current from a high value to a low value. An analogous situation exists for a change in capacitance where an increase in capacitance, corresponding to a decrease in capacitive reactance will cause the current in the circuit to change abruptly from the high-current condition to a low-current condition. Throughout the specification and claims I will refer to an element or circuit having a non-linear variation between applied voltage and effective values of current as a "non-linear" element or circuit.

In United States Letters Patent No. 1,921,787, granted August 8, 1933 upon my application Serial No. 510,750, and assigned to the assignee of the present application, I have described and claimed an arrangement in which a non-linear circuit of the type referred to above is employed to obtain pulsation apparatus in which one of the impedance elements is varied non-mechanically. My present application differs from my above-identified application in that changes in one of the impedance elements of the circuit are effected by the movement of a member actuated in accordance with the current in the circuit such as the oscillating or reciprocating member of a reciprocating device. The period of oscillation is determined predominately by the mechanical properties of the moving element and only partially by the resonance characteristics of the circuits.

My invention will be better understood from the following description taken in connection with the accompanying drawing, and its scope will be pointed out in the appended claims.

In the drawing, Fig. 1 is a simple embodiment of my invention in which the impedance-varying element comprises a movable element actuated in accordance with the current in an inductive winding connected in series relation with a series non-linear circuit; Fig. 2 is another embodiment of my invention in which the impedance-varying element comprises a movable element actuated in accordance with the current in a winding which is connected in parallel relation with the capacitor of the non-linear circuit; Fig. 3 is a modification of the arrangement shown in Fig. 2; and Fig. 4 is an application of the arrangement shown in Fig. 2 for operating a movable element confined within a sealed casing.

In Fig. 1 of the drawing, I have shown an alternating-current source 10 connected to energize a series non-linear circuit having connected in series relation a resistor 11, a saturable inductance 12, a capacitance 13, and a solenoid 14. The solenoid 14 is provided with an iron core armature 15 normally partly withdrawn from the solenoid and restrained in this normal position by spring tension or, as illustrated in the drawing for purposes of simplicity, by gravity. In accordance with the broader aspects of my invention, it is only necessary to employ a movable member which is capable of motion in such a manner that the impedance of one of said elements is varied as a result of this motion. By way of example, the armature 15 is illustrated by a simple outline representative of a hammer having a core portion inserted in its solenoid and a working head in contact with a relatively fixed surface 16. It will occur to those skilled in the art that the solenoid 14 and armature 15 may be arranged to have a saturating portion so as to serve the dual purpose of providing a saturable inductance for the non-linear circuit and the actuating means for the armature without departing from my invention in its broadest aspects.

The simple series non-linear circuit employing a closed iron core reactor, a capacitor, and a resistor has been used for control purposes for its relay property where the effective current in the circuit rises suddenly to a high value at a critical value of applied voltage called the resonant voltage. In accordance with my invention, the circuit elements are so proportioned that with the armature 15 partially withdrawn from the solenoid and a given voltage applied, the circuit is in a resonant condition and the current traversing the solenoid 14 has a relatively high value. When this takes place, the armature 15 is pulled into the core causing the inductance of the solenoid to increase. The change in inductance in the circuit caused by the movement of the armature is arranged to render the series non-linear circuit dissonant. When this occurs the circuit current decreases to a relatively low value and the armature 15 is withdrawn by gravity or spring tension. This cycle of operation repeats automatically in such a manner that the effective current in the circuit rises and falls in a pulsating manner and the armature 15 is in continual reciprocating or oscillating motion.

In Fig. 2 I have illustrated an arrangement for effecting a similar type of operation in which the solenoid 14 is connected in parallel relation with the capacitor 13 of the non-linear circuit. In this arrangement similarly to that illustrated in Fig. 1, it is only necessary to employ a movable member which is capable of motion in such a manner that the impedance of one of impedance elements of the circuit changes as a result of this motion.

Again consider the case in which the armature is normally partly withdrawn from the solenoid and is restrained in this normal position by gravity or spring tension. The circuit elements are again proportioned for series non-linear resonance so that with the applied voltage increased to a value slightly greater than the critical value for the particular circuit, the current in the circuit will rise to a relatively high value. This rise of current increases the voltage across capacitor 13. This increase in voltage energizes the solenoid sufficiently to attract the armature 15, and the circuit is so proportioned that the increase in the impedance of solenoid 14 is sufficient to throw the series non-linear circuit out of resonance. At this instant the effective current falls to a relatively low value, the capacitance voltage also falls to a relatively low value, and the armature resumes its normal biased position for which position the solenoid impedance again assumes its low or minimum value. This cycle of operation repeats automatically in such a manner that the effective current in the series non-linear circuit rises and falls in a pulsating manner, and the armature 15 is in continual reciprocating or oscillating motion.

In Fig. 3 I have shown two similar series non-linear circuits each comprising a resistor, a capacitor and a saturable reactor with a solenoid connected across each of the capacitors, and in which the circuit elements are indicated by the same numerals as were employed in Fig. 2 for the corresponding elements of one circuit and by primed numerals for the corresponding elements of the other circuit. A common core 15' is employed and normally restrained by springs 17 and 17' to be partially inserted in one solenoid, for example solenoid 14, and completely inserted in the other solenoid which, as illustrated, is solenoid 14'. The unprimed numeral non-linear circuit is proportioned for resonance for a predetermined applied voltage when the core 15' is partially withdrawn from solenoid 14 and the primed numeral circuit is proportioned for resonance for substantially the same predetermined voltage when the core 15' is partially withdrawn from solenoid 14'. Similarly, each circuit is proportioned to be dissonant when the core enters its solenoid at the given applied voltage.

Under the above conditions with the core 15' positioned as indicated in the drawing and with the applied voltage having such a value as to render the unprimed numeral circuit resonant, the core 15' is pulled into solenoid 14 and thereby renders the unprimed numeral circuit dissonant. As the core 15' is withdrawn from its solenoid 14' the primed numeral circuit is rendered resonant and the core 15' is then pulled back into solenoid 14'. This cycle of operation repeats and a continuously reciprocating system is obtained with electric power actuation for each stroke. It will be apparent to those skilled in the art that the plunger 15' need not be a single unitary magnetic body but may be constructed as two separate armatures suitably mechanically connected to operate in unison without departing from my invention in its broader aspects.

In Fig. 4 I have shown an application of the embodiment of my invention illustrated in Fig. 2 for producing oscillating or reciprocating motion of a movable element within a sealed chamber or the like so that the electrical portion of the circuit may be mechanically and electrically conductively separated from the movable element. By way of example, I have illustrated an arrangement in which the movable armature of the non-linear circuit actuates the movable element of a refrigerator pump wherein the armature and pump are confined within a sealed casing. I have shown my invention in connection with a compression refrigerating machine of the general construction shown in United States Letters Patent No. 1,736,635, granted November 19, 1929, upon an application of Christian Steenstrup. This machine as illustrated comprises a compression casing 18, having a motor with the movable element thereof within the casing and represented by the magnetic armature 19 for driving a compressor 20. The compressed refrigerant gas is discharged from the compressor 20 into the casing 18 and flows through a connection 21 into an air-cooled condenser coil 22. The refrigerant is condensed in the coil 22 and flows therefrom under the control of a float valve 23 through a pipe 24 into an evaporator 25. The vaporized refrigerant is withdrawn from the evaporator by the compressor 20 through the pipe 26 where it is compressed again and the refrigerating cycle repeated.

For purposes of simplicity in illustration the compressor 20 is shown in very elementary form to represent any suitable form of oscillating or reciprocating device for any particular application in which it is desirable to have the movable element enclosed such as an enclosed or sealed pump or compressor unit. As illustrated, the compressor comprises a piston 27 and a piston rod 28 movable within a cylinder 29. The cylinder is provided with an inlet valve 30 which admits gas from the evaporator 25 through pipe 26 when the piston moves in one direction, and is also provided with an outlet valve 31 which discharges gas under pressure to the casing 18 when the piston moves in the opposite direction. The piston is normally biased toward one end of the cylinder by any suitable means such as the spring 32.

In this application of my invention, the magnetic armature 19 is mechanically connected to the piston rod 28 or movable element of the compressor and positioned within the sealed casing in a manner to cooperate magnetically with the inductive element of a non-linear circuit. If the casing is made of non-magnetic material or a non-magnetizable alloy, the casing may be provided with a protruding portion 33, integral therewith or as illustrated in the drawing, a separate extension closed at the outer end may be secured to the casing in a manner to provide a gas-tight joint and shaped to permit movement of the armature 19 relative to the external electric circuit. When the casing is made of a magnetic material, the extension or protruding portion 33 should be made of some non-magnetic material such as copper or aluminum, or preferably a non-magnetizable metal alloy of high ohmic resistance.

The electric circuit for driving the armature and thereby the compressor is arranged externally to the armature and pump mechanism and consists of a non-linear circuit which as illustrated comprises a source of alternating current 10 connected to energize a resistor 11, a capacitor 13, and an inductance 12 connected in series relation and designated by the same numerals as were employed in Fig. 2 for the corresponding elements of the non-linear circuit. The solenoid 14 is connected in parallel relation with the capacitor 13 and magnetically associated with the movable armature 19 for relative motion therebetween. As illustrated in the drawing, the solenoid 14 may be wound around the protruding portion 33 of the sealed casing so that in the normal biased position of the piston 27, the armature 19 is partially withdrawn from the solenoid.

With this relation established between the solenoid 14 and armature 19, the non-linear circuit is proportioned to be in a resonant condition for a predetermined operating voltage. With this voltage applied to the circuit from the source 10, the cycle of operation will be the same as that described for the arrangement illustrated in Fig. 2, in which the circuit alternates between a resonant and dissonant condition automatically to reciprocate the armature 19 and thereby the piston 27. As a result gas is drawn from the evaporator 25 into the compressor cylinder 29 through the inlet valve 30 when the armature 19 is drawn into the solenoid 14, and the gas is compressed and exhausted through the outlet valve 31 into the chamber 18 when the armature 19 is partially withdrawn from the solenoid 14 by the spring 32. It will be obvious to those skilled in the art that the piston 27 may be provided with a second armature and actuating circuit in accordance with the arrangement shown in Fig. 3 for electric power actuation on each stroke.

While I have shown and described particular embodiments of my invention, it will be obvious to those skilled in the art that various changes and modifications may be made without departing from my invention in its broader aspects, and I therefore aim in the appended claims to cover all such changes and modifications as fall within the true spirit and scope of my invention.

What I claim as new and desire to secure by Letters Patent of the United States, is:

1. In combination, an electric circuit including a resistance element, a saturable inductance element and a capacitance element connected in series relation, said elements respectively having such values that when a substantially constant alternating voltage of predetermined value and frequency is applied to said circuit an abrupt change in the effective current in said circuit between relatively high and low values is obtained for a relatively small change in the impedance of one of said elements, and means controlled by the current in said circuit and operating when the current in said circuit rises to its high current value for changing the impedance of said circuit so that the current in said circuit falls to its low current value and operating when the current in said circuit falls to its low current value for changing the impedance of said circuit so that the current in said circuit rises to its high current value.

2. In combination, an electric circuit including a resistance element, a saturable inductance element, and a capacitance element connected in series relation, said elements respectively having such values that when a substantially constant alternating voltage of predetermined value and frequency is applied to said circuit an abrupt change in the effective current in said circuit between relatively high and low values is obtained for a relatively small change in the impedance of one of said elements, and a magnetic member controlled by the current in said circuit and operating when the current in said circuit rises to its high current value for changing the inductance of said circuit so that the current in said circuit falls to its low current value and operating when the current in said circuit falls to its low current value for changing the inductance of said circuit so that the current in said circuit rises to its high current value.

3. In combination, an electric circuit including a resistance element, a saturable inductance element, and a capacitance element connected in series relation, said elements respectively having such values that when a substantially constant alternating voltage of predetermined value and frequency is applied to said circuit an abrupt change in the effective current in said circuit between relatively high and low values is obtained for a relatively small change in the impedance of one of said elements, and a second inductance element connected in series relation with one of said elements and comprising a winding and a magnetic core portion movable relative to said winding and operating when the current in said circuit rises to its high current value for changing the inductance of said circuit so that the current in said circuit falls to is low current value and operating when the current in said circuit falls to its low current value for changing the inductance of said circuit so that the current in said circuit rises to its high current value, whereby the effective current in said electric circuit rises and falls in a pulsating manner and said core portion is in continual reciprocating or oscillating motion.

4. In combination, an electric circuit including a resistance element, a saturable inductance element, and a capacitance element connected in series relation, said elements respectively having such values that when a substantially constant alternating voltage of predetermined value and frequency is applied to said circuit an abrupt change in the effective current in said circuit between relatively high and low values is obtained for a relatively small change in the impedance of one of said elements, and a second inductance element connected in series relation with said series connected elements and comprising a winding and a magnetic core portion movable relative to said winding and operating when the current in said circuit rises to its high current value for changing the inductance of said circuit so that the current in said circuit falls to its low current value and operating when the current in said circuit falls to its low current value for changing the inductance of said circuit so that the current in said circuit rises to its high current value, whereby the effective current in said electric circuit rises and falls in a pulsating manner and said core portion is in continual reciprocating or oscillating motion.

5. In combination, an electric circuit including a resistance element, a saturable inductance element, and a capacitance element connected in series relation, said elements respectively having such values that when a substantially constant alternating voltage of predetermined value and frequency is applied to said circuit an abrupt change in the effective current in said circuit between relatively high and low values is obtained for a relatively small change in the impedance of one of said elements, and a second inductance element connected in parallel relation with said capacitance element and comprising a winding and a magnetic core portion movable relative to said winding and operating when the current traversing said capacitance element rises to its high current value for changing the inductance of said circuit so that the current traversing said capacitance element falls to its low current value and operating when the current traversing said capacitance falls to its low current value for changing the inductance of said circuit so that the current traversing said capacitance element rises to its high current value, whereby the effective current in said electric circuit rises and falls in a pulsating manner and said core portion is in continual reciprocating or oscillating motion.

6. The combination with a reciprocating motor comprising an operating winding and a movable member for reciprocation thereby, of an alternating-current supply circuit including a saturable reactor and a capacitor connected in series relation to energize said winding, and means movable with said movable member for varying the impedance of said circuit in response to movement of said means for alternating the energization of said winding between relatively high and low finite values for a relatively small change in said impedance.

7. The combination with a reciprocating motor comprising an operating winding and a movable member for reciprocation thereby, of an alternating-current supply circuit including a saturable reactor and a capacitor connected in series relation to energize said winding, and magnetic means movable with said movable member for varying the inductance of said circuit in response to movement of said magnetic means for alternating the energization of said winding between relatively high and low finite values for a relatively small change in said inductance.

8. The combination with a reciprocating motor comprising an operating winding and a movable member, of an alternating-current supply circuit including a saturable reactor and a capacitor connected in series relation to energize said winding, a magnetic core mechanically connected for operating said movable member and arranged for reciprocation within said winding for varying the inductance of said winding to alternate the energization of said winding between relatively high and low finite values for a relatively small change in said inductance.

CHAUNCEY G. SUITS.